US 9,412,310 B2

(12) United States Patent
Nobori et al.

(10) Patent No.: US 9,412,310 B2
(45) Date of Patent: Aug. 9, 2016

(54) IMAGE PROCESSING APPARATUS, PROJECTOR, AND IMAGE PROCESSING METHOD

(71) Applicant: SEIKO EPSON CORPORATION, Tokyo (JP)

(72) Inventors: Tatsuhiko Nobori, Matsumoto (JP); Daisuke Hayashi, Matsumoto (JP); Hirotaka Mochizuki, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 210 days.

(21) Appl. No.: 14/218,016

(22) Filed: Mar. 18, 2014

(65) Prior Publication Data

US 2014/0285538 A1 Sep. 25, 2014

(30) Foreign Application Priority Data

Mar. 22, 2013 (JP) ................. 2013-059567

(51) Int. Cl.
*G03B 21/20* (2006.01)
*H04N 9/31* (2006.01)
*G09G 3/34* (2006.01)
*H04N 5/20* (2006.01)
*G09G 3/00* (2006.01)
*G09G 3/36* (2006.01)

(52) U.S. Cl.
CPC .......... *G09G 3/3406* (2013.01); *G03B 21/2053* (2013.01); *H04N 5/20* (2013.01); *H04N 9/3155* (2013.01); *H04N 9/3182* (2013.01); *G09G 3/002* (2013.01); *G09G 3/3611* (2013.01); *G09G 2320/0646* (2013.01); *G09G 2360/16* (2013.01)

(58) Field of Classification Search
CPC .... G03B 21/14; G03B 21/20; G03B 21/2053; H04N 9/3155; H04N 9/3182; H04N 5/20; G09G 3/3406; G09G 2360/16
USPC .................................... 353/88, 97
See application file for complete search history.

(56) References Cited

U.S. PATENT DOCUMENTS

2007/0018951 A1 1/2007 Nobori et al.
2007/0025683 A1 2/2007 Nobori
(Continued)

FOREIGN PATENT DOCUMENTS

JP A-2004-361703 12/2004
JP A-2007-41535 2/2007
(Continued)

*Primary Examiner* — William C Dowling
*Assistant Examiner* — Ryan Howard
(74) *Attorney, Agent, or Firm* — Oliff PLC

(57) ABSTRACT

An image processing apparatus includes a signal generation section that generates a drive signal to drive a light attenuation member that attenuates light radiated from a light source based on a difference between first transmittance and second transmittance, the first transmittance being a target value calculated based on image data and the second transmittance being detected based on the position of the light attenuation member, an expansion factor calculation section that calculates an expansion factor based on the first transmittance and the second transmittance, an expansion section that expands the range of the distribution of luminance values in the image data based on the expansion factor calculated by the expansion factor calculation section, and an output section that outputs the image data expanded by the expansion section to a driver that drives a light modulator that modulates light incident thereon.

7 Claims, 6 Drawing Sheets

(56) References Cited

U.S. PATENT DOCUMENTS

| | | | |
|---|---|---|---|
| 2007/0288574 A1 | 12/2007 | Koster et al. | |
| 2008/0036872 A1 | 2/2008 | Nobori | |
| 2009/0284544 A1* | 11/2009 | Nobori | G09G 3/3406 345/589 |
| 2010/0208214 A1 | 8/2010 | Kawamura et al. | |
| 2010/0238419 A1 | 9/2010 | Mochizuki | |
| 2011/0085145 A1 | 4/2011 | Hayashi | |
| 2011/0096302 A1 | 4/2011 | Mochizuki et al. | |
| 2012/0019524 A1 | 1/2012 | Nobori | |
| 2012/0019568 A1 | 1/2012 | Nobori | |
| 2012/0154681 A1* | 6/2012 | Morimoto | G03B 21/14 348/645 |
| 2013/0050291 A1 | 2/2013 | Nobori et al. | |
| 2014/0078167 A1 | 3/2014 | Nobori | |
| 2014/0253581 A1 | 9/2014 | Nobori | |

FOREIGN PATENT DOCUMENTS

| | | |
|---|---|---|
| JP | A-2007-47244 | 2/2007 |
| JP | A-2007-58167 | 3/2007 |
| JP | A-2007-121541 | 5/2007 |
| JP | A-2007-241172 | 9/2007 |
| JP | A-2008-15225 | 1/2008 |
| JP | A-2008-145938 | 6/2008 |
| JP | B-4210863 | 1/2009 |
| JP | A-2009-25445 | 2/2009 |
| JP | A-2009-276500 | 11/2009 |
| JP | B-4432933 | 3/2010 |
| JP | A-2010-191139 | 9/2010 |
| JP | A-2010-204520 | 9/2010 |
| JP | A-2010-210722 | 9/2010 |
| JP | A-2010-211091 | 9/2010 |
| JP | A-2010-217651 | 9/2010 |
| JP | B-4591724 | 12/2010 |
| JP | A-2011-85618 | 4/2011 |
| JP | B-4687515 | 5/2011 |
| JP | B-4687526 | 5/2011 |
| JP | A-2011-118322 | 6/2011 |
| JP | B-4862354 | 1/2012 |
| JP | A-2012-28963 | 2/2012 |
| JP | A-2012-28964 | 2/2012 |
| JP | A-2012-28965 | 2/2012 |
| JP | B-4956932 | 6/2012 |
| JP | B-4962722 | 6/2012 |
| JP | B-4967637 | 7/2012 |
| JP | A-2013-50523 | 3/2013 |
| JP | 2014-048527 A | 3/2014 |
| JP | 2014-059530 A | 4/2014 |
| JP | 2014-174191 A | 9/2014 |

* cited by examiner

IMAGE PROCESSING APPARATUS, PROJECTOR, AND IMAGE PROCESSING METHOD

The entire disclosure of Japanese Patent Application No. 2013-059567, filed Mar. 22, 2013, is expressly incorporated by reference herein.

BACKGROUND

1. Technical Field

The present invention relates to an image processing apparatus, a projector, and an image processing method.

2. Related Art

In an image processing apparatus, there is a known technology for improving the contrast of an image by carrying out the following processes combined with each other: the process of adjusting the amount of light radiated from a light source; and the process of expanding the range of the distribution of luminance values contained in image data. JP-A-2004-361703 describes a technology for adjusting the amount of light radiated from a light source by rotating a light attenuation plate with a stepper motor. JP-A-2004-361703 further describes a technology for expanding the range of the distribution of luminance values in image data by multiplying an image signal by an expansion coefficient.

In JP-A-2004-361703, it takes finite time to move the light attenuation plate. Therefore, in the course of movement of the light attenuation plate, the luminance value expanded in the image processing undesirably does not match the changed amount of light resulting from the movement of the light attenuation plate in some cases.

SUMMARY

An advantage of some aspects of the invention is to expand the range of the distribution of luminance values in image data by using an expansion factor that matches the position of a light attenuation member.

An aspect of the invention provides an image processing apparatus including a signal generation section that generates a drive signal to drive a light attenuation member that attenuates light radiated from a light source based on a difference between first transmittance and second difference, the first difference being a target value calculated based on image data and the second transmittance being detected based on the position of the light attenuation member, an expansion factor calculation section that calculates an expansion factor based on the first transmittance and the second transmittance, an expansion section that expands the range of the distribution of luminance values in the image data based on the expansion factor calculated by the expansion factor calculation section, and an output section that outputs the image data expanded by the expansion section to a driver that drives a light modulator that modulates light incident thereon. According to the image processing apparatus, the range of the distribution of the luminance values in the image data is expanded by using an expansion factor that matches the position of the light attenuation member, unlike a case where the expansion factor is calculated based only on the first transmittance.

In a preferable aspect, the drive signal generated by the signal generation section allows the drive section to perform displacement at a specified speed. According to the thus configured image processing apparatus, the sound emitted when the drive section is driven is suppressed as compared with a case where the drive signal does not allow the drive section to perform displacement at a specified speed.

In a preferable aspect, the expansion factor calculation section calculates the expansion factor based on the first transmittance when the first transmittance and the second transmittance are equal to each other whereas calculating the expansion factor based on the first transmittance and the second transmittance when the first transmittance and the second transmittance differ from each other. According to the thus configured image processing apparatus, the range of the distribution of the luminance values in the image data is expanded based on different expansion factors depending on whether or not the first transmittance and the second transmittance are equal to each other.

In a preferable aspect, the expansion factor calculation section calculates the expansion factor by using the following Expression (1).

$$kg = ka1^{1/\gamma} \cdot ka2^{-2/\gamma} \qquad (1)$$

(where kg represents the expansion factor, ka1 represents the first transmittance, ka2 represents the second transmittance, and γ represents a predetermined coefficient. According to the thus configured image processing apparatus, a change in brightness of an image expressed by the image data is suppressed)

In a preferable aspect, the image processing apparatus further includes a transmittance calculation section that calculates the first transmittance based on a maximum luminance value and an average luminance value calculated from grayscales contained in the image data. According to the thus configured image processing apparatus, the light attenuation member is driven in accordance with the maximum luminance value and the average luminance value in the image data.

In a preferable aspect, the drive section is a stepper motor. According to the thus configured image processing apparatus, the position of the light attenuation member is detected based on the drive signal.

Another aspect of the invention provides a projector including a light attenuation member that attenuates light radiated from a light source, a drive section that drives the light attenuation member, a light modulator that modulates the light, a signal generation section that generates a drive signal provided to the drive section based on a difference between first transmittance and second transmittance, the first transmittance being a target value calculated based on image data and the second transmittance being detected based on the position of the light attenuation member, an expansion factor calculation section that calculates an expansion factor based on the first transmittance and the second transmittance, an expansion section that expands the range of the distribution of luminance values in the image data based on the expansion factor calculated by the expansion factor calculation section, and a driver that drives the light modulator based on the image data expanded by the expansion section. According to the projector, the range of the distribution of the luminance values in the image data is expanded by using an expansion factor that matches the position of the light attenuation member, unlike a case where the expansion factor is calculated based only on the first transmittance.

Still another aspect of the invention provides an image processing method including generating a drive signal to drive a light attenuation member that attenuates light radiated from a light source based on a difference between first transmittance and second transmittance, the first transmittance being a target value calculated based on image data and the second transmittance being detected based on the position of the light attenuation member, calculating an expansion factor based on the first transmittance and the second transmittance, expanding the range of the distribution of luminance values in the image data based on the expansion factor, and outputting the expanded image data to a driver that drives a light modulator that modulates light incident thereon. According to the image processing method, the range of the distribution of the luminance values in the image data is expanded by using an expansion factor that matches the position of the light attenuation member, unlike a case where the expansion factor is calculated based only on the first transmittance.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
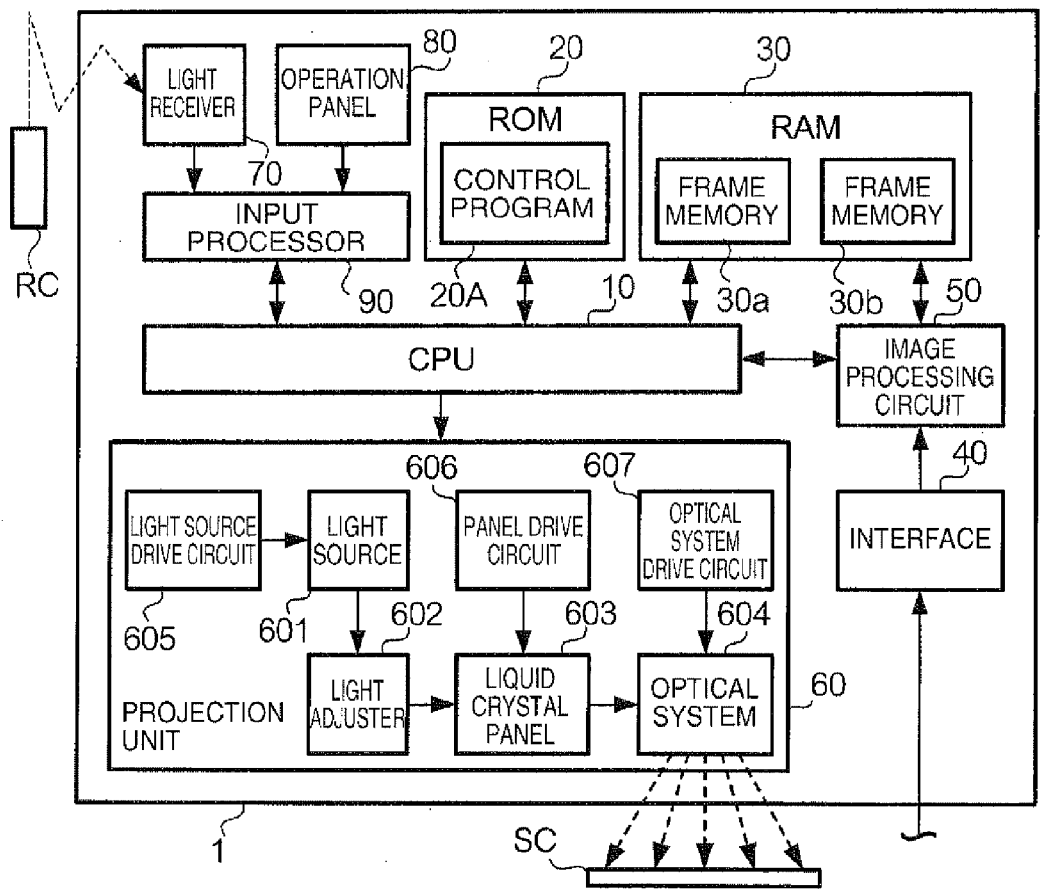
FIG. 1 is a block diagram showing the internal configuration of a projector.

FIG. 1 is a block diagram showing the internal configuration of a projector 1 according to an embodiment of the invention. The projector 1 is an apparatus that projects an image on a screen SC. A controller RC is an apparatus for controlling the projector 1 wirelessly, for example, via an infrared communication. In other words, the controller RC is what is called a remote control. The screen SC is a flat surface on which an image projected from the projector 1 is displayed.

The projector 1 includes a CPU (central processing unit) 10, a ROM (read only memory) 20, a RAM (random access memory) 30, an IF (interface) 40, an image processing circuit 50, a projection unit 60, a light receiver 70, an operation panel 80, and an input processor 90. The CPU 10 is a control device that controls the components of the projector 1 by executing a control program 20A. The ROM 20 is a nonvolatile storage device that stores various kinds of programs and data. The ROM 20 stores the control program 20A executed by the CPU 10. The RAM 30 is a volatile storage device that stores data. The RAM 30 has frame memories 30a and 30b. The frame memory 30a is an area where image data corresponding to one frame out of video images carried by a video signal is stored. The frame memory 30b is an area where image data to be projected on the screen SC is stored.

The IF 40 acquires a video signal from an external apparatus, such as a DVD (digital versatile disc) player and a personal computer. The IF 40 has a variety of terminals to be connected to the external apparatus (for example, USB (universal serial bus) terminal, LAN (local area network) terminal, S terminal, RCA terminal, D-sub (D-subminiature) terminal, and HDMI (high-definition multimedia interface: registered trademark) terminal). The IF 40 further extracts vertical and horizontal sync signals from the acquired video signal. The image processing circuit 50 performs image processing on images contained in the video signal. The image processing circuit 50 writes image data representing the images having undergone the image processing into the frame memory 30a on a frame basis.

The projection unit 60 includes a light source 601, a light adjustor 602, a liquid crystal panel 603, an optical system 604, a light source drive circuit 605, a panel drive circuit 606, and an optical system drive circuit 607. The light source 601 has a high-pressure mercury lamp, a halogen lamp, a metal halide lamp, or any other type of lamp, or any other type of light emitter and irradiates the liquid crystal panel 603 with light.

Figure 2:
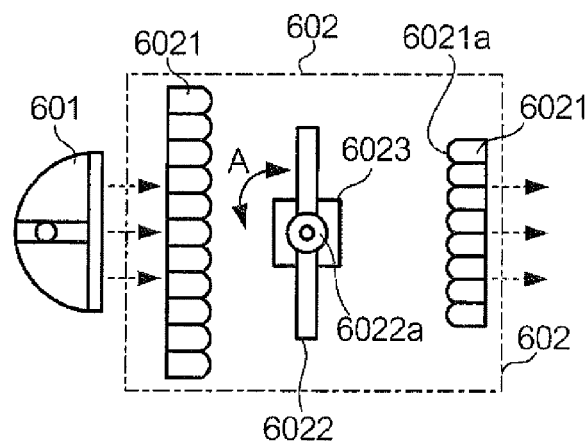
FIG. 2 primarily shows the configuration of a light adjustor.

FIG. 2 primarily shows the configuration of the light adjustor 602. The light adjustor 602 adjusts the light radiated from the light source 601. The light adjustor 602 includes a pair of fly's eye lenses 6021, a light attenuation plate 6022, and a stepper motor 6023. Each of the fly's eye lenses 6021 homogenizes the light radiated from the light source 601 and has a plurality of minute lenses 6021a arranged in a flat plane. The light attenuation plate 6022 (example of light attenuation member) attenuates the light radiated from the light source 601. In FIG. 2, the light attenuation plate 6022 is disposed in a position between the pair of fly's eye lenses 6021. The light attenuation plate 6022 has a rotating shaft 6022a. The stepper motor 6023 rotates the light attenuation plate 6022 in accordance with a drive signal from the CPU 10 to adjust the light transmittance of the light attenuation plate 6022 based on the amount of rotation thereof. The stepper motor 6023 (example of drive section) rotates the light attenuation plate 6022 around the rotating shaft 6022a in the direction indicated by the arrow A.

Referring to FIG. 1 again, the liquid crystal panel 603 is a light modulator that receives the light adjusted by the light adjustor 602 and modulates the light in accordance with image data. In the example, the liquid crystal panel 603 has a plurality of pixels arranged in a matrix. For example, the liquid crystal panel 603 has a display area having XGA-grade resolution (XGA stands for eXtended Graphics Array) and formed of 1024×768 pixels. In the example, the liquid crystal panel 603 is a transmissive liquid crystal panel, and the transmittance of each of the pixels is controlled in accordance with the image data. The projector 1 has three liquid crystal panels 603 corresponding to RGB three primary colors. The light from the light source 601 is separated into RGB three color light fluxes, each of which is incident on the corresponding liquid crystal panel 603. The color light fluxes having passed through and having been modulated by the liquid crystal panels are combined with one another by a cross dichroic prism or any other component and outputted to the optical system 604. The optical system 604 includes a lens that enlarges the light having been modulated into image light by the liquid crystal panels 603 and projects the enlarged image light on the screen SC, a zoom lens that enlarges or reduces an image to be projected and brings the image into focus, a zoom adjustment motor that adjusts the degree of zooming, a focus adjustment motor that makes the focus adjustment, and other components. The light source drive circuit 605 drives the light source 601 under the control of the CPU 10. The panel drive circuit 606 (example of driver) drives the liquid crystal panels 603 in accordance with the image data outputted from the CPU 10. The optical system drive circuit 607 drives the motors provided in the optical system 604 under the control of the CPU 10.

The light receiver 70 receives an infrared signal transmitted from the controller RC, decodes the received infrared signal, and outputs the decoded signal to the input processor 90. The operation panel 80 has buttons and switches that allow a user to power on/off the projector 1 and perform a variety of types of operation. The input processor 90 produces information representing operation performed by the user through the controller RC or the operation panel 80 and outputs the produced information to the CPU 10.

Figure 3:
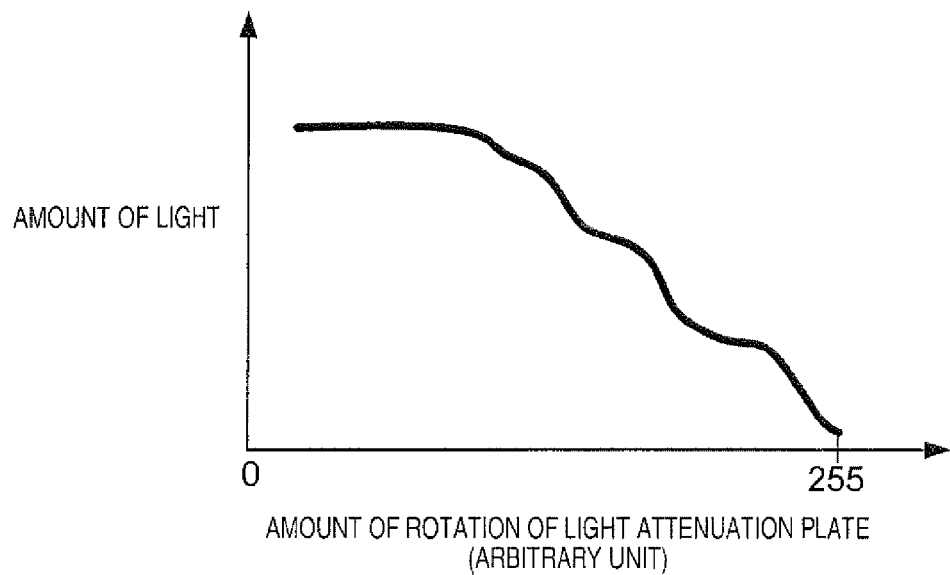
FIG. 3 is a descriptive view showing a change in the amount of light passing through a light attenuation plate versus the amount of rotation thereof.

FIG. 3 is a descriptive view showing a change in the amount of light that passes through the light attenuation plate 6022 versus the amount of rotation thereof. FIG. 3 shows a change in the amount of light in a case where the light attenuation plate 6022 is rotated from a position where it is parallel to the direction in which the light propagates to a position where it is perpendicular to the light propagation direction. The horizontal axis represents the amount of rotation of the light attenuation plate 6022. In the example, the amount of rotation of the light attenuation plate 6022 is expressed by a value ranging from "0" to "255" or expressed in 256 steps. When the amount of rotation is "0", the light attenuation plate 6022 is so positioned that it is parallel to the light propagation direction. When the amount of rotation is "255", the light attenuation plate 6022 is so positioned that it is perpendicular to the light propagation direction. The vertical axis represents the amount of light that passes through the light adjustor 602. When the amount of rotation of the light attenuation plate 6022 increases, the amount of light that passes through the light adjustor 602 decreases, as shown in FIG. 3. It is ideally desirable that the amount of light changes linearly with the amount of rotation of the light attenuation plate 6022. In practice, however, the amount of light changes nonlinearly with the amount of rotation of the light attenuation plate 6022 due to the structure of the light adjustor 602 described with reference to FIG. 2 (for example, due to the fact that each of the fly's eye lenses 6021 does not have a single uniform structure but is a combination of a plurality of minute lenses 6021a). To achieve a target amount of light in a specified period (within a single frame, for example), it is necessary to change the frequency at which the stepper motor 6023 is driven in accordance with the characteristic curve representing the relationship between the amount of rotation and the amount of transmitted light. Changing the drive frequency, however, undesirably causes the sound emitted from the driven stepper motor 6023 to be recognized as noise in some cases. Further, when the amount of rotation is large in the first place, the light attenuation plate 6022 cannot be rotated by a target amount of rotation in a specified period in some cases. If the light attenuation plate 6022 cannot be rotated by a target amount of rotation, the adjustment of the light from the light source 601 undesirably does not match a change in the luminance values in image data adjusted by image processing in some cases. If the adjustment of the light from the light source 601 does not match a change in the luminance values in the image data, the brightness of a projected image undesirably changes and the change is recognized as display failure in some cases. The projector 1 prevents the noise from the stepper motor 6023 and the display failure.

Figure 4:
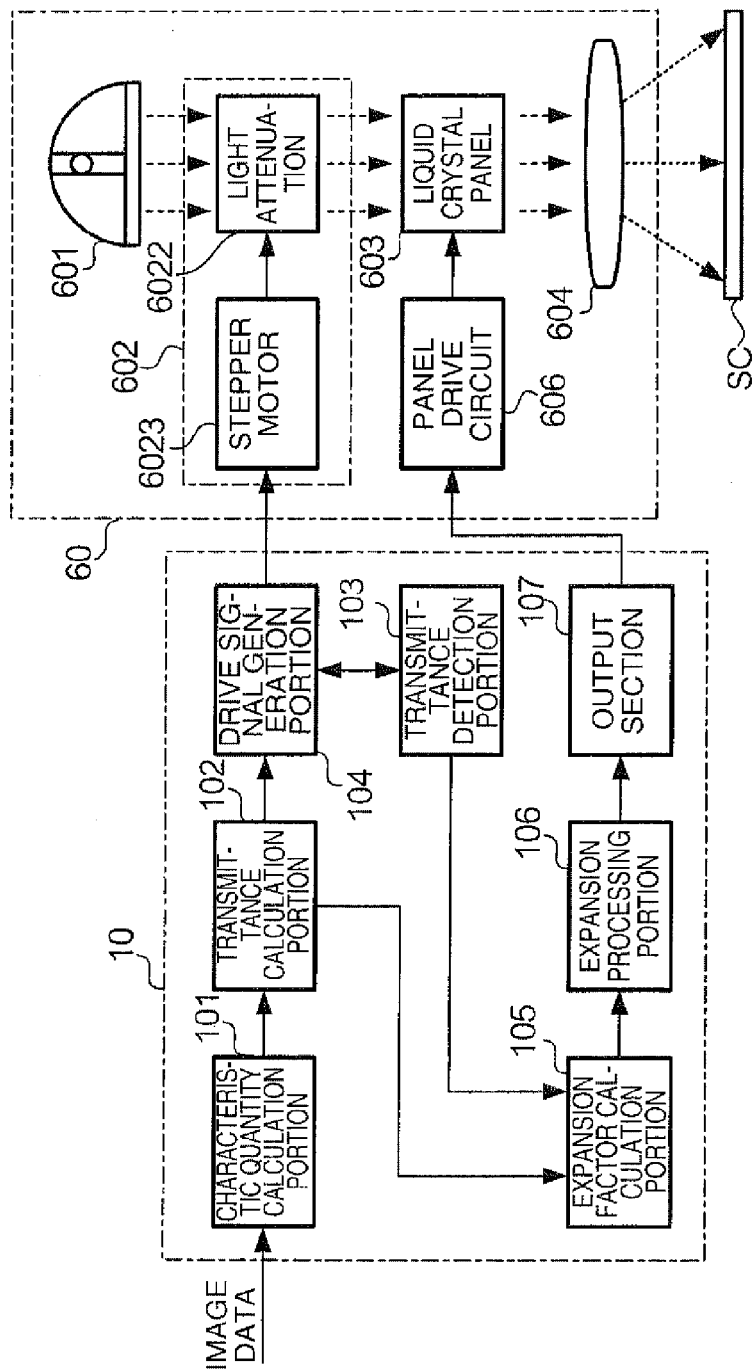
FIG. 4 is a block diagram primarily showing functions achieved by a CPU.

FIG. 4 is a block diagram primarily showing functions achieved by the CPU 10. The CPU 10 has a characteristic quantity calculation portion 101, a transmittance calculation portion 102, a transmittance detection portion 103, a drive signal generation portion 104, an expansion factor calculation portion 105, an expansion processing portion 106, and an output portion 107 as functional elements. The characteristic quantity calculation portion 101 calculates a characteristic quantity based on the luminance values in the image data. The characteristic quantity is a value representing characteristics of the distribution of luminance values in the image data. In the example, the characteristic quantity includes the average of the luminance values contained in image data (hereinafter referred to as "APL (average picture level) value") and a maximum of the luminance values contained in image data (hereinafter referred to as "WP (white peak) value"). Image data contains the grayscale of each of a plurality of color components (ROB three primary colors, for example), and the luminance value is calculated from the grayscale. The transmittance calculation portion 102 calculates first transmittance based on the characteristic quantities calculated by the characteristic quantity calculation portion 101. The first transmittance is a target value representing how much the light attenuation plate 6022 transmits the light radiated from the light source 601. The transmittance detection portion 103 detects second transmittance based on the amount of rotation of the light attenuation plate 6022. The second transmittance is an estimated value representing how much the light attenuation plate 6022 transmits the light radiated from the light source 601. The drive signal generation portion 104 generates, based on the difference between the first transmittance calculated by the transmittance calculation portion 102 and the second transmittance detected by the transmittance detection portion 103, a drive signal provided to the stepper motor 6023. The expansion factor calculation portion 105 calculates an expansion factor based on the first transmittance and the second transmittance. The expansion processing portion 106 corrects the grayscales contained in the image data and expands the range of the luminance values based on the expansion factor calculated by the expansion factor calculation portion 105. The output portion 107 outputs the image data having the grayscales corrected by the expansion processing portion 106 to the panel drive circuit 606.

Figure 5:
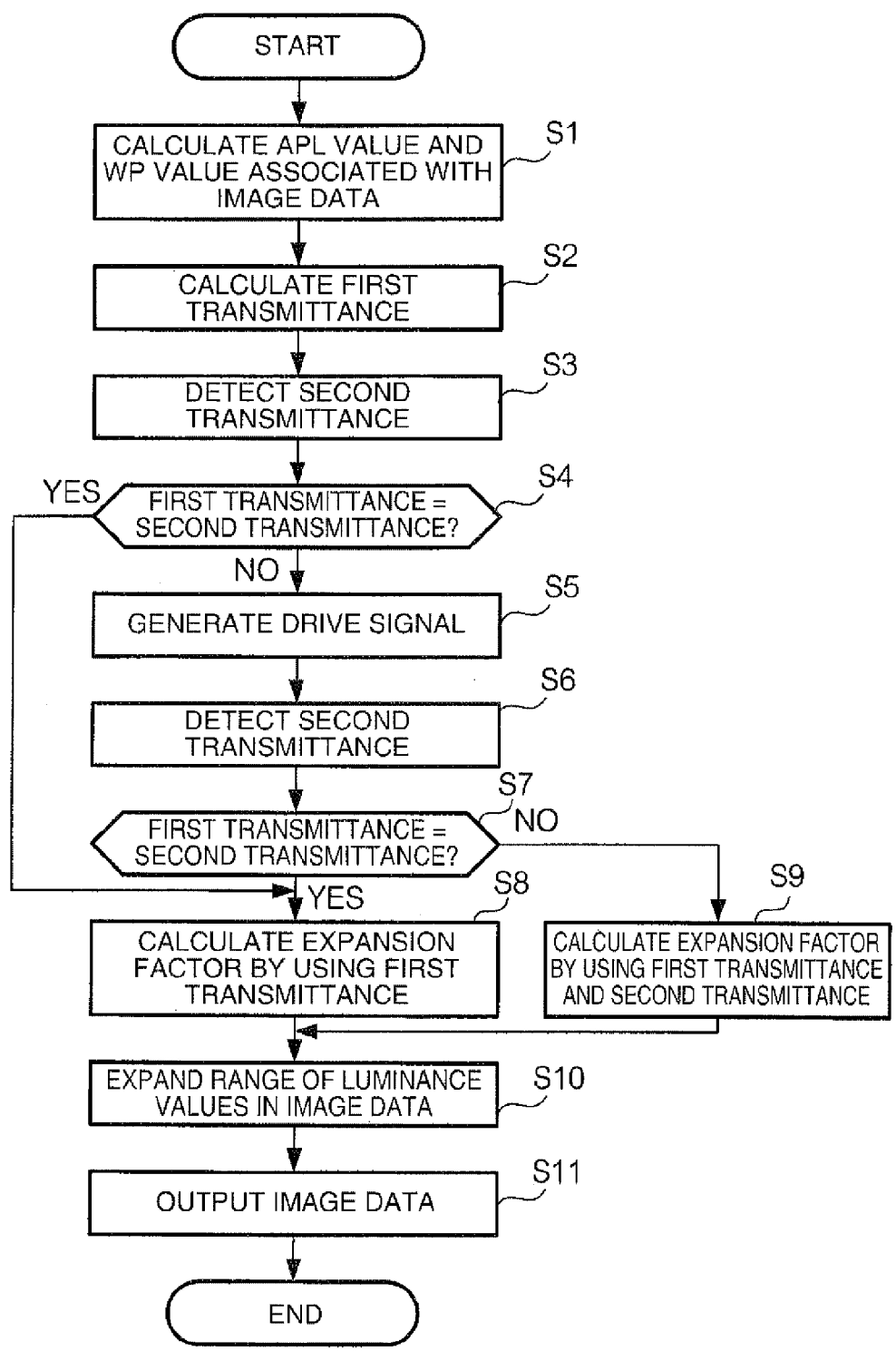
FIG. 5 is a flowchart showing processes carried out by a projector according to an embodiment.

FIG. 5 is a flowchart showing processes carried out by the projector 1. The following processes are initiated, for example, in response to an input of a video signal to the projector 1. When a video signal is inputted to the projector 1, the CPU 10 reads the control program 20A from the ROM 20 and carries out the following processes. The processes shown in FIG. 5 are carried out for each frame in image data.

In step S1, the CPU 10 calculates the APL value and the WP value associated with the image data. Specifically, the CPU 10 reads the image data from the frame memory 30a and calculates the APL value and the WP value by carrying out the following processes. The CPU 10 first calculates a luminance value Y1 at each pixel based on the corresponding grayscale contained in the image data. The luminance value Y1 is calculated, for example, by using the following Expression (2).

$$Y1 = 0.299R + 0.587G + 0.144B \tag{2}$$

(Y1: the luminance value at a pixel being processed, R, G, the grayscales of the RGB components at the pixel)

The CPU 10 then divides an image expressed by the image data into a predetermined number (48×64, for example) of small areas Di. In the example, each of the small areas Di contains 256 (16×16) pixels. The CPU 10 calculates the average of the luminance values Y1 (hereinafter referred to as "average luminance value Y2$i$") at the 256 pixels in each of the small areas Di. The CPU 10 then calculates the average of the plurality of average luminance values Y2$i$ as the APL value. The CPU 10 further calculates a maximum of the plurality of average luminance values Y2$i$ as the WP value. The CPU 10 stores the calculated APL value and WP value in the RAM 30.

Figure 6:
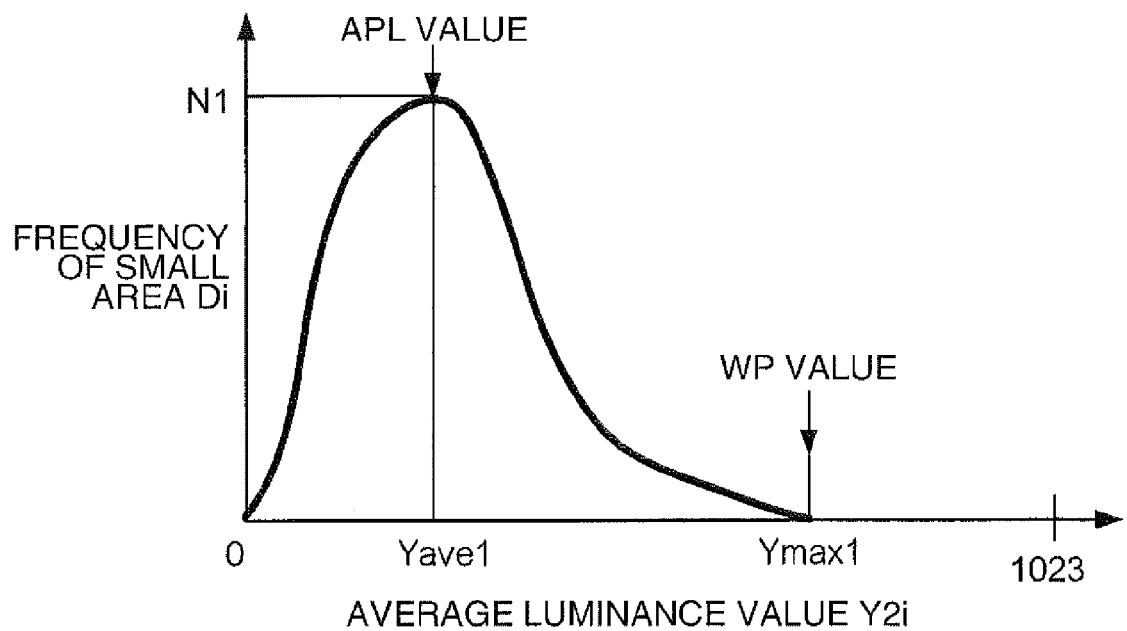
FIG. 6 shows an example of a luminance histogram associated with image data.

FIG. 6 shows an example of a luminance histogram associated with image data. FIG. 6 specifically shows a histogram of the average luminance value Y2$i$. In FIG. 6, the horizontal axis represents the average luminance value Y2$i$. In the example, the average luminance value Y2$i$ is expressed in 10 bits. The vertical axis represents the frequency of the small area Di. In the example shown in FIG. 6, the APL value is Yave1, and the WP value is Ymax1. Further, a maximum frequency of the small area Di is N1. The APL value is by definition smaller than or equal to the WP value.

Referring to FIG. 5 again, in step S2, the CPU 10 calculates the first transmittance. The CPU 10 calculates the first transmittance based on the APL value and the WP value associated with the image data read from the RAM 30. The calculation of the first transmittance is performed by referring to a transmittance lookup table (hereinafter referred to as "LUT"). The LUT is stored in the ROM 20. The CPU 10 stores the calculated first transmittance in the RAM 30.

Figure 7:
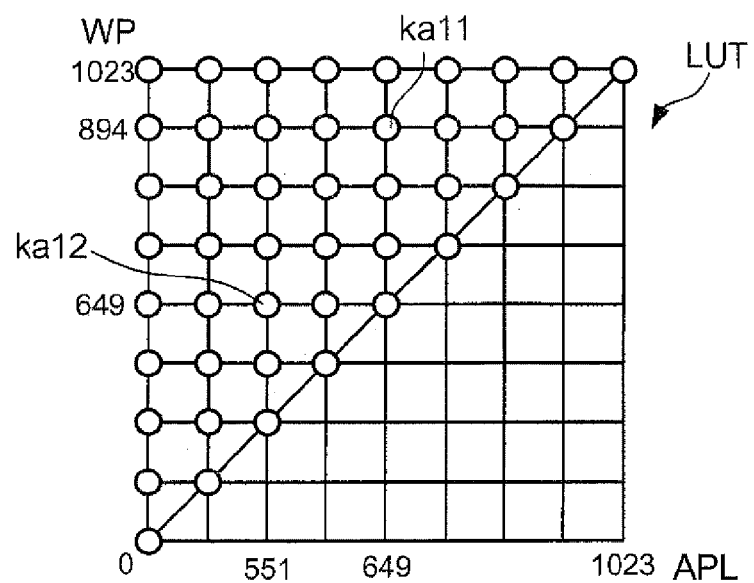
FIG. 7 shows a model of a transmittance lookup table.

FIG. 7 shows a model of the LUT. In the model shown in FIG. 7, the LUT is shown in the form of a grid in which the horizontal axis represents the APL value and the vertical axis represents the WP value. The APL values and the WP values shown in FIG. 7 are presented only by way of example, and arbitrary values different from those in FIG. 7 may be stored in the LUT. First transmittance ka1 (1≥ka1≥0) is stored at each point where grid lines intersect each other (hereinafter referred to as "grid point"). The first transmittance ka1 is calculated based on the combination of an APL value and a WP value. For example, when the APL value is 649 and the WP value is 894, the first transmittance ka1 is ka11, and when the APL value is 551 and the WP value is 649, the first transmittance ka1 is ka12. When the combination of an APL value and a WP value is not present at any of the grid points, the first transmittance ka1 is calculated by using interpolation. Specifically, based on first transmittance ka1 shown at each of a plurality of grid points around the position indicated by the combination of an APL value and a WP value, first transmittance ka1 corresponding to the combination is interpolated. It is noted that since an APL value is smaller than or equal to a WP value as described above, no first transmittance ka1 is recorded in one-half the LUT, specifically, the lower right portion thereof. The CPU 10 stores the calculated first transmittance ka1 in the RAM 30.

Referring to FIG. 5 again, in step S3, the CPU 10 detects the second transmittance. The CPU 10 detects the second transmittance based on the amount of rotation of the light attenuation plate 6022. Specifically, the drive signal outputted to the stepper motor 6023 contains a specified number of pulse signals per frame, and the CPU 10 stores the total number of pulse signals outputted to the stepper motor 6023 in the RAM 30. The CPU 10 detects the amount of rotation of the light attenuation plate 6022 based on the total number of pulse signals stored in the RAM 30. Further, the ROM 20 stores 256 pieces of data representing the relationship between the amount of rotation of the light attenuation plate 6022 and second transmittance ka2 (1≥ka2≥0). The CPU 10 refers to the data to detect second transmittance ka2 based on the amount of rotation of the light attenuation plate 6022. The CPU 10 stores the detected second transmittance ka2 in the RAM 30.

In step S4, the CPU 10 determines whether or not the first transmittance ka1 and the second transmittance ka2 are equal to each other. Specifically, the CPU 10 reads the first transmittance ka1 and the second transmittance ka2 from the RAM 30 and compares the two values with each other. When the CPU 10 determines that the first transmittance ka1 and the second transmittance ka2 are equal to each other (step S4: YES), the CPU 10 proceeds to the process in step S8. When the CPU 10 determines that the first transmittance ka1 and the second transmittance ka2 are not equal to each other (step S4: NO), the CPU 10 proceeds to the process in step S5.

In step S5, the CPU 10 generates a drive signal based on the difference between the first transmittance ka1 and the second transmittance ka2. Specifically, when the second transmittance ka2 is greater than the first transmittance ka1, the CPU 10 generates a drive signal that increases the amount of rotation of the light attenuation plate 6022 so that the amount of light passing through the light adjuster 602 decreases (the shaft of the stepper motor 6023 is rotated in the forward direction in the example). When the second transmittance ka2 is smaller than the first transmittance ka1, the CPU 10 generates a drive signal that decreases the amount of rotation of the light attenuation plate 6022 so that the amount of light passing through the light adjuster 602 increases (the shaft of the stepper motor 6023 is rotated in the reverse direction in the example). The rotation of the shaft of the stepper motor 6023 in the forward and reverse directions is an example of "displacement" of the drive section. The CPU 10 outputs the generated drive signal to the stepper motor 6023.

Figure 8:
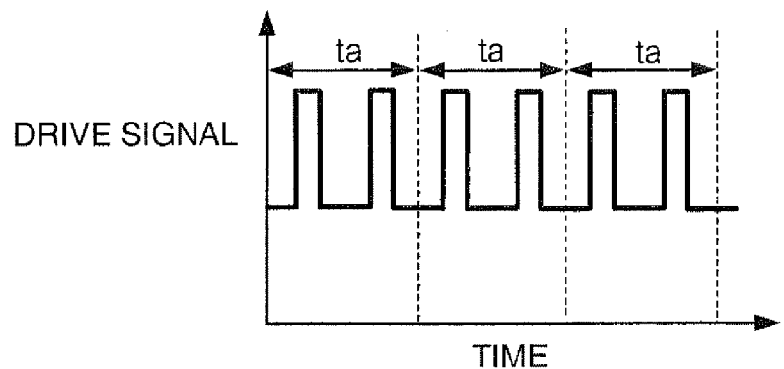
FIG. 8 shows an example of a drive signal.

FIG. 8 shows an example of the drive signal generated by the CPU 10. The horizontal axis represents time, and the vertical axis represents the magnitude of the drive signal. A period to represents a period corresponding to a single frame. The drive signal contains a specified number of pulse signals per frame, as described above. In the example shown in FIG. 8, the drive signal contains two pulse signals per frame. When the stepper motor 6023 is thus driven at a fixed drive frequency, the shaft of the stepper motor 6023 rotates at a specified speed. As a result, the sound emitted from the driven stepper motor 6023 is hardly recognized as noise.

Referring to FIG. 5 again, in step S6, the CPU 10 detects the second transmittance ka2 again. In step S7, the CPU 10 determines whether or not the first transmittance ka1 and the second transmittance ka2 are equal to each other. When the CPU 10 determines that the first transmittance ka1 and the second transmittance ka2 are equal to each other (step S7: YES), the CPU 10 proceeds to the process in step S8. When the CPU 10 determines that the first transmittance ka1 and the second transmittance ka2 are not equal to each other (step S7: NO), the CPU 10 proceeds to the process in step S9.

In step S8, the CPU 10 calculates the expansion factor by using the first transmittance ka1. The CPU 10 reads the first transmittance ka1 from the RAM 30 and calculates an expansion factor kg1 (≥1) by using the following Expression (3).

$$kg1 = ka1^{-1/\gamma} \quad (3)$$

(where $\gamma$ is a gamma value of the liquid crystal panel 603 and is, for example, 2.2. The CPU 10 stores the calculated expansion factor kg1 in the RAM 30)

In step S9, the CPU 10 calculates the expansion factor by using the first transmittance ka1 and the second transmittance ka2. The CPU 10 reads the first transmittance ka1 and the second transmittance ka2 from the RAM 30 and calculates an expansion factor kg2 (>0) by using the following Expression (4).

$$kg2 = ka1^{1/\gamma} \cdot ka2^{-2/\gamma} \quad (4)$$

The CPU 10 stores the calculated expansion factor kg2 in the RAM 30. Expression (4) is rewritten into the following Expression (5).

$$kg2 = ka1^{-1/\gamma} \cdot ka1^{2/\gamma} \cdot ka2^{-2/\gamma} = kg1 \cdot ka1^{2/\gamma} \cdot ka2^{-2/\gamma} \quad (5)$$

As clearly seen from Expression (5), the expansion factor kg2 is calculated by multiplying the expansion factor kg1 by ($ka1^{2/\gamma} \cdot ka2^{-2/\gamma}$). The term ($ka1^{2/\gamma} \cdot ka2^{-2/\gamma}$) is a coefficient for modifying the expansion factor kg1.

In step S10, the CPU 10 expands the range of the luminance values in the image data by using the expansion factor kg (kg1 or kg2, the same holds true in the following description). The CPU 10 reads the image data from the frame memory 30a and the expansion factor kg from the RAM 30 and expands the luminance range by using the following Expression (6).

$$Rnew = Rold \times kg$$
$$Gnew = Gold \times kg$$
$$Bnew = Bold \times kg \qquad (6)$$

(Rnew, Gnew, Bnew: the grayscales of the RGB components at a pixel being processed after the luminance range is expanded, Rold, Gold, Bold: the grayscales of the RGB components at the pixel before the luminance range is expanded)

The term "expansion" of the luminance range used herein includes a case where the expansion factor kg2 is smaller than 1 and the luminance range is hence narrowed. The CPU 10 writes the image data having the expanded luminance range in the frame memory 30b. When the expansion factor kg is greater than 1 and the luminance range is hence expanded, the contrast of the image is improved.

Figure 9:
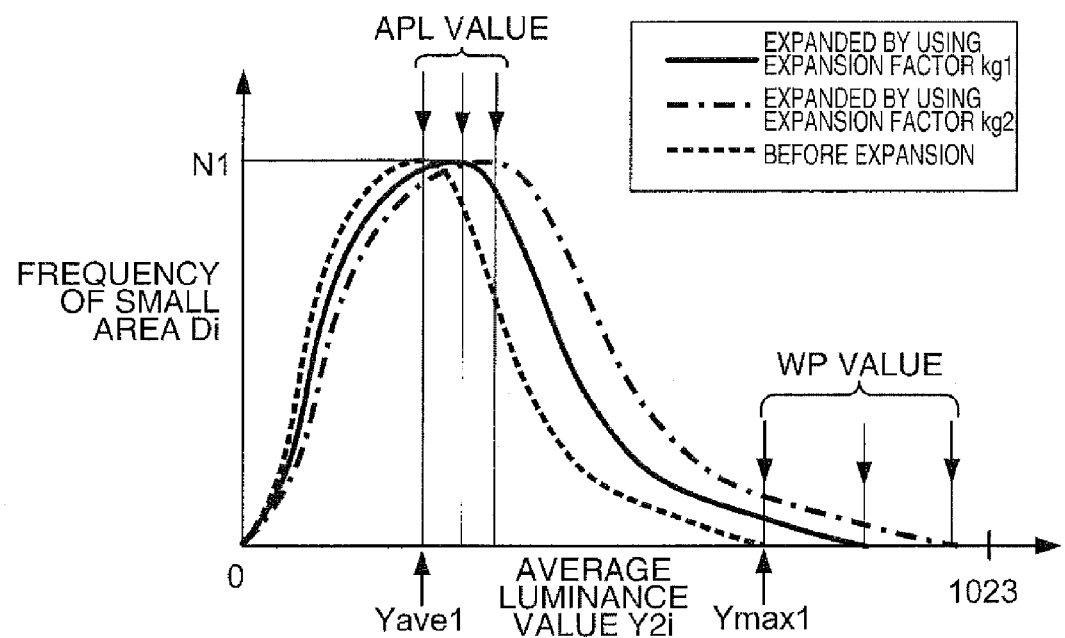
FIG. 9 shows an example of a change in a luminance histogram associated with image data.

FIG. 9 shows an example of a change in the luminance histogram associated with an image data between the state before the luminance range is expanded and the state after the luminance range is expanded. FIG. 9 shows a histogram of the average luminance value Y2$i$, as in FIG. 6. In FIG. 9, the solid line represents a histogram in a case where the luminance range is expanded by using the expansion factor kg1. The dashed line represents a histogram in a case where the luminance range is expanded by using the expansion factor kg2. The broken line represents a histogram associated with the image data before the luminance range is expanded. FIG. 9 shows a case where ka1≠ka2 (ka1>ka2, in particular) and hence kg2>kg1. In this case, after the determination process in step S7, the control proceeds to step S9, and the luminance range of the image data is expanded by using the expansion factor kg2. The luminance range is therefore expanded based on the expansion factor according to the delay of the change in the second transmittance to the first transmittance (that is, lack of the amount of rotation of the light attenuation plate 6022), whereby a change in brightness of an image projected on the screen SC is suppressed. Further, when ka2>ka1, kg1>kg2. In this case as well, the luminance range of the image data is expanded by using the expansion factor kg2, whereby a change in brightness of an image projected on the screen SC is suppressed. When ka1=ka2, the luminance range is expanded by using the expansion factor kg1. In this case, the contrast of the image is also improved with no change in the brightness itself of an image projected on the screen SC does not change before and after the processes shown in FIG. 5.

Referring to FIG. 5 again, in step S11, the CPU 10 reads the image data from the frame memory 30b and outputs the image data to the panel drive circuit 606. When the image data is outputted to the panel drive circuit 606, the liquid crystal panel 603 is driven in accordance with the image data.

Variations

The invention is not limited to the embodiment described above, and a variety of variations are conceivable. Some variations will be described below. Among the variations described below, two or more of them may be combined with each other.

1. Variation 1

The characteristic quantities of image data are not limited to the combination of the APL value and the WP value. For example, in addition to the APL value and the WP value, a minimum of the luminance values contained in the image data may be used as another characteristic quantity. In another case, only the ALP value or the WP value may be used as the characteristic quantity.

2. Variation 2

The method for calculating the APL value and the WP value associated with image data is not limited to the method shown in the embodiment. For example, the APL value and the WP value may be calculated without dividing an image into the small areas Di. Further, in the embodiment described above, the WP value is calculated by determining a maximum average luminance value Y2$i$, but the WP value may be calculated by determining a maximum luminance value Y1. In another case, the APL value and the WP value may be calculated based on a partial area of an image.

3. Variation 3

In the embodiment described above, the case where the LUT stores values of the first transmittance ka1 has been described by way of example. Instead, the LUT may store coefficients used to calculate the first transmittance ka1.

4. Variation 4

Image data may contain an alpha value representing the transparency at each pixel as well as the grayscale at the pixel. In this case, no calculation corresponding to Expression (6) is made for the alpha value.

5. Variation 5

Expressions (1) to (6) described above are presented only by way of example, and the luminance values Y1 or the expansion factor kg may be calculated or the luminance range may be expanded based on expressions different from Expressions (1) to (6). For example, in step S8, the expansion factor kg1 may be calculated based on Expression (4) (or Expression (5)) instead of Expression (3).

6. Variation 6

The processes shown in FIG. 5 are not necessarily carried out on a single-frame basis. The processes shown in FIG. 5 may be initiated, for example, whenever several frames are processed, whenever a predetermined period elapses, or whenever a scene shown in an image is changed. In this case, the processes in step S3 and the following steps are repeatedly carried out until the APL value and the WP value associated with image data are newly calculated in step S1.

7. Variation 7

The way the stepper motor 6023 drives the light attenuation plate 6022 is not limited to rotation of the light attenuation plate 6022. For example, the stepper motor 6023 may cause the light attenuation plate 6022 to slide in accordance with a drive signal to adjust the light transmittance in accordance with the amount of movement.

Further, the drive section is not limited to the stepper motor 6023. For example, the stepper motor 6023 may be replaced with a solenoid.

In addition to the points described above, the internal configuration of the projector 1 is not limited to that described with reference to FIG. 1. The projector 1 may have any internal configuration capable of carrying out the process in each of the steps shown in FIG. 5.

What is claimed is:

1. An image processing apparatus comprising:
a signal generation section that generates a drive signal to drive a light attenuation member that attenuates light radiated from a light source based on a difference between a first transmittance and a second transmittance, the first transmittance being a target value calculated based on image data and the second transmittance being detected based on a position of the light attenuation member;

an expansion factor calculation section that calculates an expansion factor based on the first transmittance and the second transmittance;

an expansion section that expands a range of a distribution of luminance values in the image data based on the expansion factor calculated by the expansion factor calculation section; and an output section that outputs the image data expanded by the expansion section to a driver that drives a light modulator that modulates light incident thereon.

2. The image processing apparatus according to claim 1, wherein the drive signal generated by the signal generation section allows the drive section to perform displacement at a specified speed.

3. The image processing apparatus according to claim 1, wherein the expansion factor calculation section calculates the expansion factor by using the following Expression (1):

$$kg = ka1^{1/\gamma} \cdot ka2^{-2/\gamma} \qquad (1)$$

where kg represents the expansion factor, ka1 represents the first transmittance, ka2 represents the second transmittance, and γ represents a predetermined coefficient.

4. The image processing apparatus according to claim 1, further comprising a transmittance calculation section that calculates the first transmittance based on a maximum luminance value and an average luminance value calculated from grayscales contained in the image data.

5. The image processing apparatus according to claim 1, wherein the drive section is a stepper motor.

6. A projector comprising:
a light attenuation member that attenuates light radiated from a light source;
a drive section that drives the light attenuation member;
a light modulator that modulates the light;
a signal generation section that generates a drive signal provided to the drive section based on a difference between a first transmittance and a second transmittance, the first transmittance being a target value calculated based on image data and the second transmittance being detected based on a position of the light attenuation member;
an expansion factor calculation section that calculates an expansion factor based on the first transmittance and the second transmittance;
an expansion section that expands a range of a distribution of luminance values in the image data based on the expansion factor calculated by the expansion factor calculation section; and
a driver that drives the light modulator based on the image data expanded by the expansion section.

7. An image processing method comprising:
generating a drive signal to drive a light attenuation member that attenuates light radiated from a light source based on a difference between a first transmittance and a second transmittance, the first transmittance being a target value calculated based on image data and the second transmittance being detected based on a position of the light attenuation member;
calculating an expansion factor based on the first transmittance and the second transmittance;
expanding a range of a distribution of luminance values in the image data based on the expansion factor; and
outputting the expanded image data to a driver that drives a light modulator that modulates light incident thereon.

* * * * *